United States Patent [19]

Clark

[11] Patent Number: 5,606,990
[45] Date of Patent: Mar. 4, 1997

[54] POTABLE RAINWATER COLLECTING APPARATUS

[76] Inventor: Kenneth G. Clark, 17 Fountain Road., Buderim, Queensland, 4556, Australia

[21] Appl. No.: 537,891
[22] PCT Filed: Apr. 29, 1994
[86] PCT No.: PCT/AU94/00224
   § 371 Date: Oct. 30, 1995
   § 102(e) Date: Oct. 30, 1995
[87] PCT Pub. No.: WO94/25691
   PCT Pub. Date: Nov. 10, 1994

[30] Foreign Application Priority Data

Apr. 29, 1993 [AU] Australia ................................. PL8525

[51] Int. Cl.⁶ .................................................. E03B 3/03
[52] U.S. Cl. ......................................... 137/259; 137/312
[58] Field of Search .................................. 137/259, 266, 137/581, 312, 313, 255; 220/571

[56] References Cited

U.S. PATENT DOCUMENTS 1,647,900  11/1927  Carpenter ................................. 137/259
5,299,591  4/1994  Duncan .................................. 137/312 X

*Primary Examiner*—Kevin Lee
*Attorney, Agent, or Firm*—Abelman, Frayne & Schwab

[57] ABSTRACT

An apparatus for use in collecting potable rainwater is disclosed which includes a trough member having a dished surface which is adapted to receive rainwater when operatively disposed. A discharge outlet in the trough member is at or near the lowermost portion of the trough when the trough member is operatively disposed. A delivery tube is connected to the discharge outlet for conveying received rainwater for passage to a reservoir. A mounting frame is provided for mounting the trough member in a rain-receiving location, and a bracket operatively connects the trough member to the mounting frame. The parts are made and arranged so that the bracket will enable the trough member to be moved between the operative disposition in which rainwater is received and then delivered via the discharge outlet and the delivery tube and an inoperative disposition in which it has been tilted from the operative disposition to an inverted, semi-inverted or inclined nature, so that the dished trough surface will not support liquid or solid materials.

12 Claims, 5 Drawing Sheets

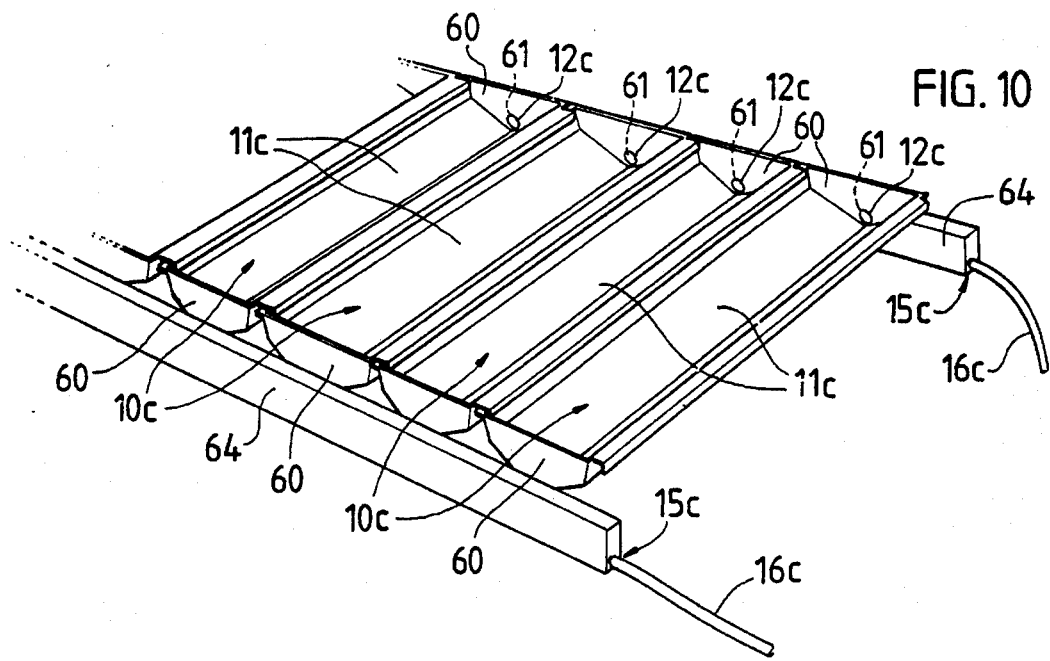
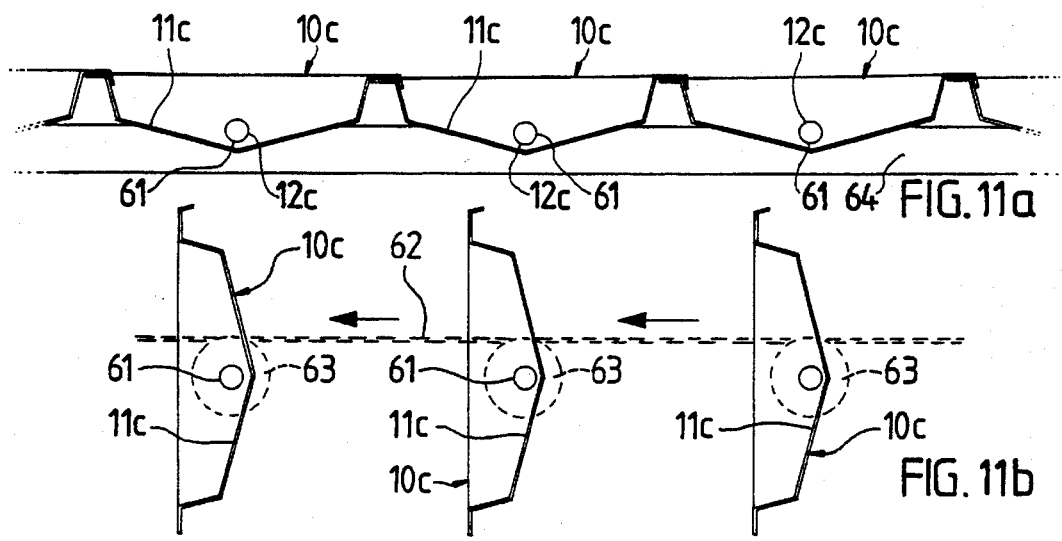

5,606,990

POTABLE RAINWATER COLLECTING APPARATUS

TECHNICAL FIELD OF THE INVENTION

This invention relates to novel apparatus for use in collecting potable rainwater.

BACKGROUND ART

While nobody would disagree that water is the one essential needed for the survival of all humans and animals, the availability of pure or high quality water, particularly for human consumption, continues to be one of the biggest problems for man because of contamination and impurities in public water supplies in which there are constantly found such things as pesticides, industrial chemicals, heavy metals, bacteria and rust by way of example, while additionally the many chemicals purposely added for various reasons all reduce the purity level which it would be most desirable to achieve. Some benefits are considered to be obtained by collecting rainwater in tanks, but the water is then contaminated by dirt and debris from roof tops. Some advantages can be achieved by the use of relatively expensive filter systems or by buying filtered or otherwise treated water, or by importing well-known brands of imported water, but even these are very much less than desired and involve costs beyond the means of the average householders.

My present invention has been devised with a view to overcoming or alleviating the problems currently associated with the acquiring of quality drinking water as aforementioned, and it has for its principal object the provision of novel apparatus for use in collecting potable rainwater whereby contact of the rainwater with surfaces having a deletious effect thereon will be avoided.

Another object of the invention is to provide novel rainwater collection apparatus which will involve a once-only cost in that it will be both efficient and robust so as to be usable for a very long and continuous period. A further object is to provide such apparatus which will be of relatively simple construction and can be made and installed without undue expense, and yet will lend itself to small domestic applications or major commercial applications or any applications therebetween. Other objects and advantages of the invention will be appreciated from the subsequent descriptions herein of preferred embodiments of the invention.

DISCLOSURE OF THE INVENTION

With the foregoing and other objects in view, my invention resides broadly in apparatus for use in collecting potable rainwater including:

a trough member having a dished surface and adapted to receive rainwater when operatively disposed;

a discharge outlet in said trough member in that part thereof which is lowermost or near lowermost when the trough member is operatively disposed;

delivery tube means connected to said discharge outlet for conveying received rainwater for passage to storage or distribution means;

mounting frame means whereby said trough member may be mounted in a rain-receiving location, and tilt means operatively connecting said trough member to said mounting frame means;

the parts being so made and arranged that said tilt means will enable said trough member to be moved between said operative disposition in which rainwater is received and then delivered via said discharge outlet and said delivery tube means and an inoperative disposition in which it has been tilted from said operative disposition to one of such inverted, semi-inverted or inclined nature that said dished trough surface will not support liquid or solid materials.

In one form of the invention, given by way of example only, said trough member is suitably of substantially conical shape so that in operation it is of dished conical form and has its discharge outlet at the lowermost apex portion thereof. Likewise, in some instances, said delivery tube means suitably comprises a flexible hose leading directly from said discharge outlet to storage or distribution means. In a very basic embodiment, said tilt means may include an elongate bracket having its outer or distal end connected to that part of the trough member which is the underneath part when operatively disposed, the other or proximal end of the bracket being pivotally connected about a horizontal tilt axis to a mounting post or other mounting surface constituting said mounting frame means. Preferably, releasable locking pin means are provided for securing said proximal end of said bracket to said mounting frame means in at least the operative disposition of said trough member.

In some alternative embodiments said elongate bracket is tubular to constitute a first part of said delivery tube means, its distal end being connected to said discharge outlet while its proximal end is connected sealably with a flexible tube constituting a second, downstream part of said delivery tube means. In such a construction the proximal end of said elongate bracket suitably is sealably pivotable about a bearing tube on the mounting frame means, said bearing tube having openings to receive water from the proximal end of the bracket and having a remote outlet end connected sealably with said tube constituting said second, downstream part of said delivery tube means.

In any one of a number of other embodiments, the tilt means may comprise an elongate support member having its outer or distal end connected to that part of the trough member which is the underneath part when operatively disposed, the other or proximal end of the support member being journalled in a horizontal bearing on said mounting frame means, rotation of said support member in said bearing acting to pivot the trough member towards inverted inoperative disposition. In such a construction, said elongate support member is preferably tubular to constitute a first part of said delivery tube means, its distal end being connected to said discharge outlet while its proximal end is connected sealably with a tube constituting a second, downstream part of said delivery tube means.

While the foregoing descriptions focus on constructions involving a single trough member and support member, it will be appreciated that volume collection requires a plurality of collectors arranged singly or in a bank thereof. Thus the elongate support member is preferably one of a plurality of parallel horizontal support members, the said trough member being one of a plurality of trough members corresponding to the support members, said tilt means including crank means whereby all support members may be rotated in unison to move the trough members from operative to inoperative dispositions and vice versa.

Likewise, instead of the trough member being conical, it may in other embodiments be of substantially rectangular dish-like form having opposed water-retaining rims or surfaces, said tilt means comprising horizontal pivot axis mounting means about which the trough member may be pivoted between operative disposition and substantially inverted inoperative disposition. In a bank of such collectors said trough member is suitably one of a plurality of parallel horizontal trough members each tiltable about a respective horizontal pivot axis mounting means, and means being provided whereby said trough members may be pivoted in unison from operative to inoperative dispositions and vice versa, the trough members being adjacent one another to provide a continuous collection area and/or shade area when fully operative or fully inoperative.

BRIEF DESCRIPTION OF THE DRAWINGS

In order that the invention may be more readily understood and put into practical effect, reference will now be made to the accompanying drawings wherein:

FIG. 10 is a top perspective view of a different embodiment of the invention employing trough members of rectangular form in parallelism, and FIGS. 11a, 11b and 11c show schematically and in section the trough member components of the embodiment of FIG. 10, in operative disposition, part-turned disposition and fully inoperative disposition, respectively.

Figure 1:
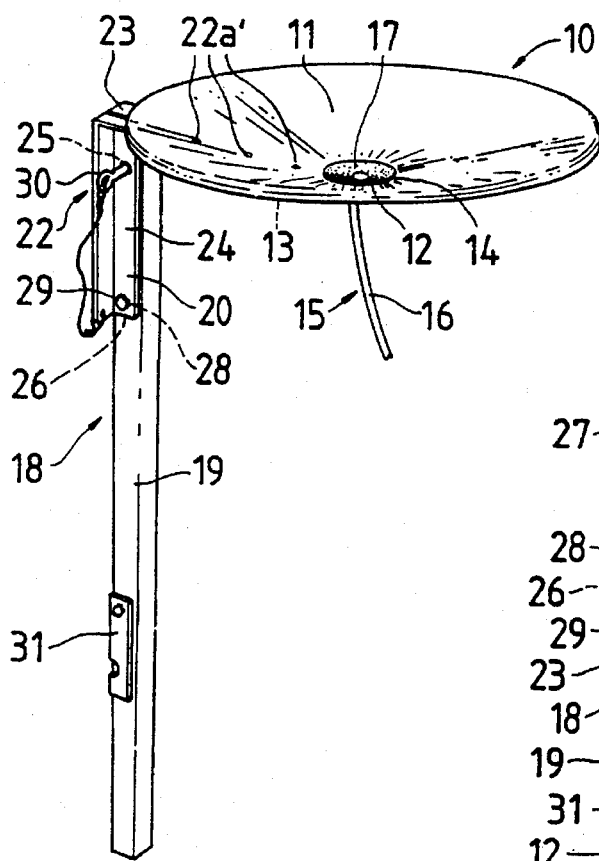
FIG. 1 shows in top, front perspective view the most simple embodiment of the invention showing a single trough member connected by a pivotable bracket to an upright mounting post, the trough member being in operative disposition.
Figure 2:
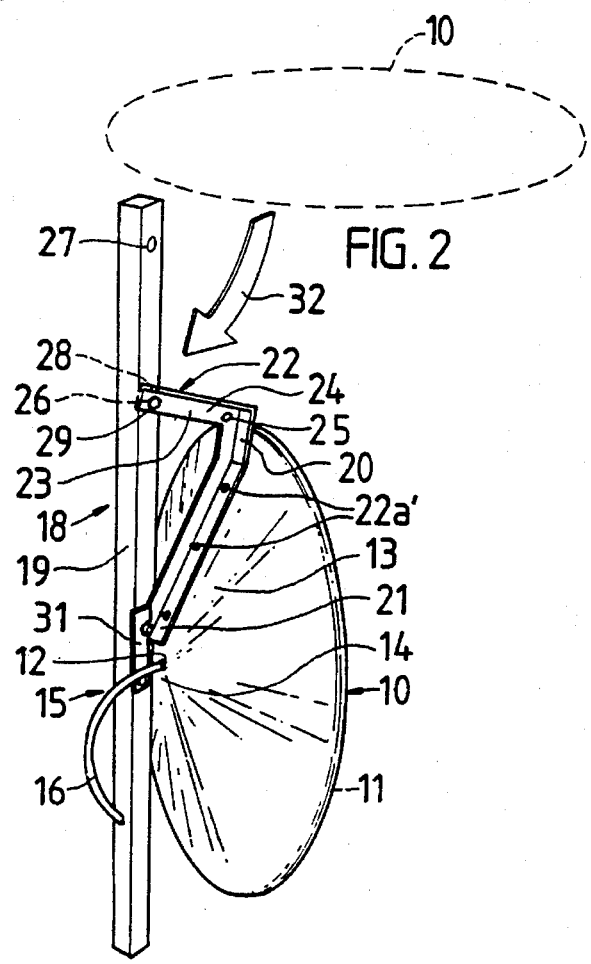
FIG. 2 shows the components of FIG. 1, but with the trough member and its mounting bracket moved to inoperative disposition, and viewed from the rear.
Figure 3:
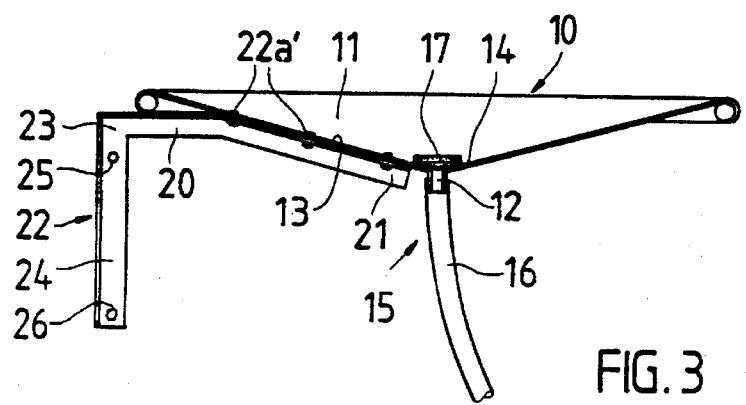
FIG. 3 is a sectional elevational view showing the trough member and its mounting bracket, corresponding to FIG. 1 and FIG. 2.

As shown initially in FIGS. 1 to 3 of the drawings, the rainwater collecting apparatus in this embodiment comprises a trough member 10 having a dished surface 11 and adapted to receive rainwater when operatively disposed as in FIGS. 1 and 3, and it will be seen that there is a discharge outlet 12 in the trough member on the part 13 which is lowermost when the trough member is operatively disposed. It will be seen that the trough member 10 is of substantially conical shape so that it is of dished conical form and has the discharge outlet 12 centrally therein at the lowermost apex portion 14. The trough member has delivery tube means 15 connected to the discharge outlet 12 for conveying received rainwater away from the apparatus for passage to storage or distribution means, the delivery tube means 15 in this instance being a simple flexible hose 16 leading directly from the discharge outlet 12 to a simple container (not shown) therebeneath by way of example. It is preferred that a filter 17 be provided at the discharge outlet 12 at the top of the hose connection in order to exclude dust in particular.

There is provided any suitable form of mounting frame means 18 adapted to support the trough member 10 in a rain-receiving location, such as on a stand-alone steel post 19 in this instance, and the connection between the post 19 and trough member 10 is made by tilt means 22 which in this case includes a bracket 20 of elongated form having its outer or distal end 21 secured by fasteners 22 radially along the lowermost part 13 of the trough member 10 while its inner or proximal end 23 has an affixing arm 24 rigid therewith and at an angle to extend down the post 19 when the trough member is in raised operative disposition as shown in FIG. 1. The affixing arm 24 has upper and lower apertures 25 and 26 registering with apertures 27 and 28 in the post 19, the lower apertures 26 and 28 being interconnected by a pivot bolt 29, while the upper apertures 25 and 27 may be engaged by a releasable pin 30 as shown in FIG. 1 when the apparatus is operative. FIG. 2 shows how release of the pin 30 enables the bracket 20 and trough 10 thereon to be swung down in the direction of arrow 32 about the pivot bolt 29 to inoperative disposition, there being provided a standard form of catch member 31 whereby the latter disposition may be maintained.

It will thus be apparent that the invention is so designed that the tilt means 22 will enable the trough member 10 to be moved between the operative disposition in which rainwater is received and then delivered via the discharge outlet 12 and delivery tube means 15, and an inoperative disposition which can be one of such semi-inverted or inclined nature that the dished trough surface 11 will not support liquid or solid materials. In other embodiments as later described, the trough member could conveniently be fully inverted, all such dispositions falling within the broad idea of the invention.

Figure 4:
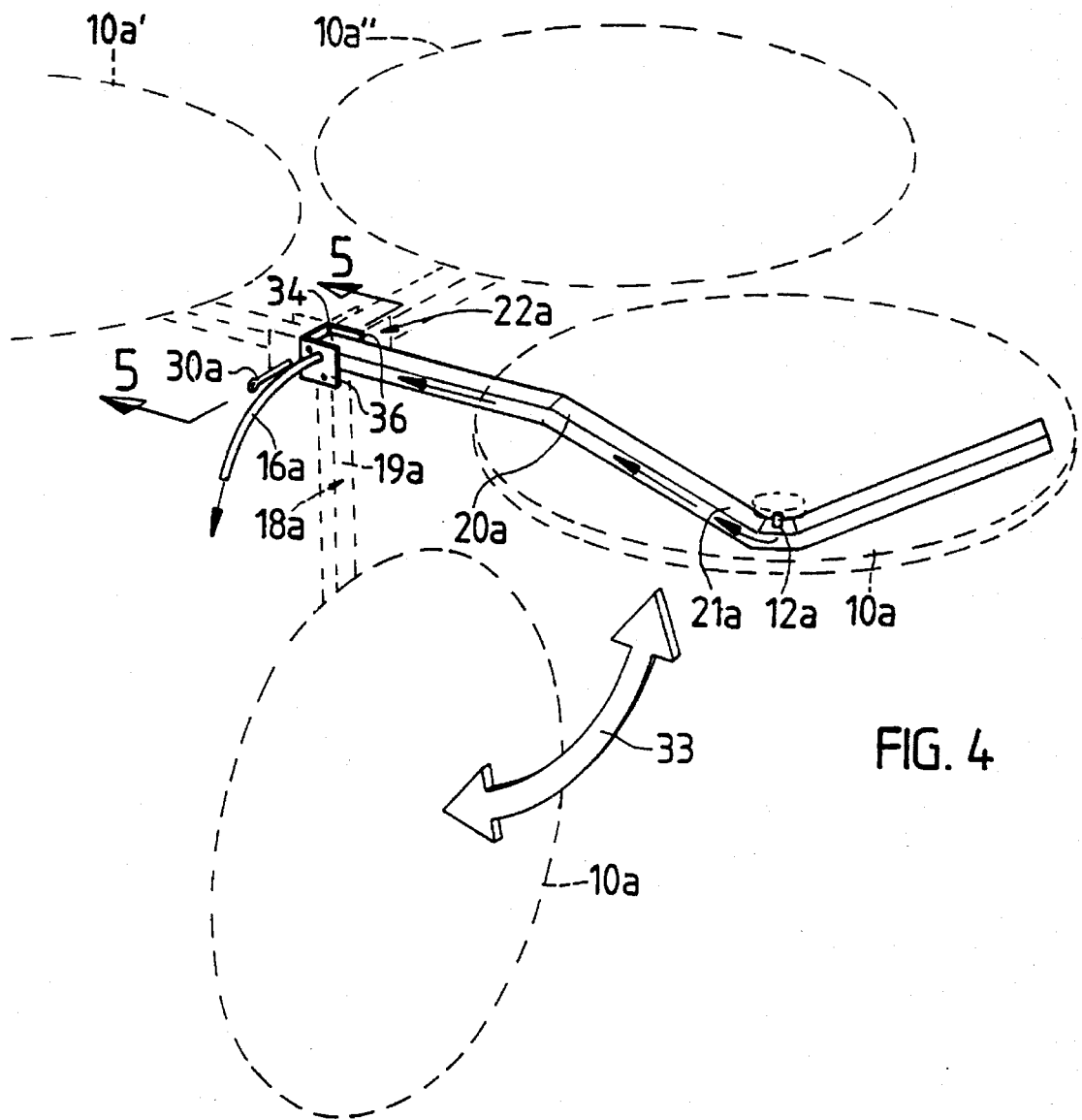
FIG. 4 shows in front perspective view a modified form of rainwater collecting apparatus, in which the support bracket forms part of the delivery tube means, this view showing the positions of adjacent trough members in a close group thereof.
Figure 5:
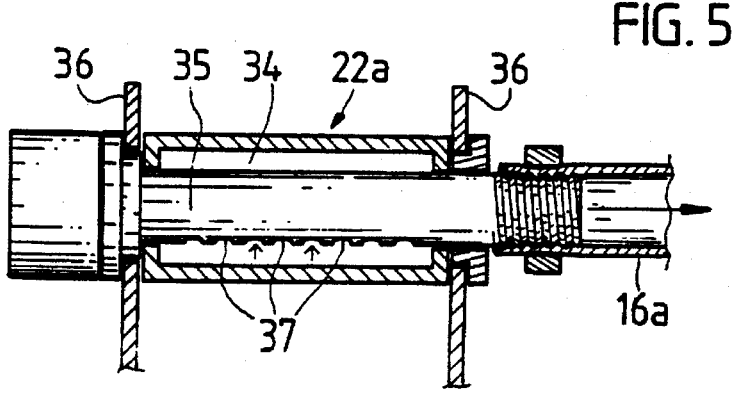
FIG. 5 is a sectional elevation on the line 5—5 in FIG. 4 showing the pivotal connection of the proximal end of the tubular support bracket, delivering to a second part of the delivery tube means.

Turning next to the embodiment of FIGS. 4 and 5, similar components to those of FIGS. 1 to 3 are given the same numerals but suffixed by the letter "a". The position of the trough member 10a is indicated in dotted outline and it can be moved in the direction of arrow 33 to the lowered position also outlined. The positions of further trough members are indicated at 10a' and 10a" if it is desired to provide three or four at right angles to each other from a common mounting frame means 18a. In this case, the tilt means 22a includes an elongate tubular member 20a having its outer or distal end 21a shaped to cradle-like shape to support the trough member 10a, the upper rim of which is above the proximal end 23a so that collected water will pass via discharge outlet 12a into the interior of the tubular member 20a and flow to the proximal extremity marked 34, the latter being sealed so that water can only flow into a bearing tube 35 passing sealably therethrough as shown in FIG. 5 and rigidly mounted relative to the mounting frame means 18a. One end of the bearing tube 35 has a delivery tube 16a thereon, there being shown in FIG. 5 spaced mounting brackets 36 between which the tubular arm 20 is pivotable to move the trough member 10a between the positions illustrated, suitable locking pin means 30a enabling the desired attitude to be maintained. FIG. 5 shows the openings 37 in the bearing tube 35 to permit water in the closed end 34 of the tubular arm 20a to enter the tube and pass to the hose or tube 16a.

Figure 6:
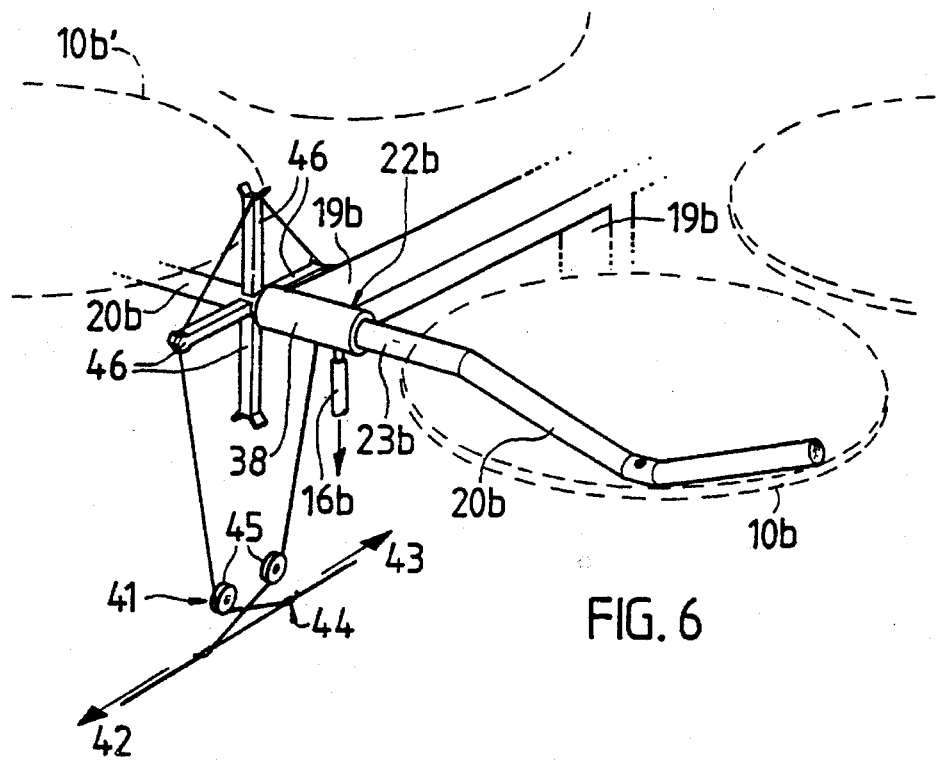
FIG. 6 shows in perspective view another form of rainwater collecting apparatus according to the invention, the trough member being pivotable about a horizontal axis for inversion purposes.
Figure 7:
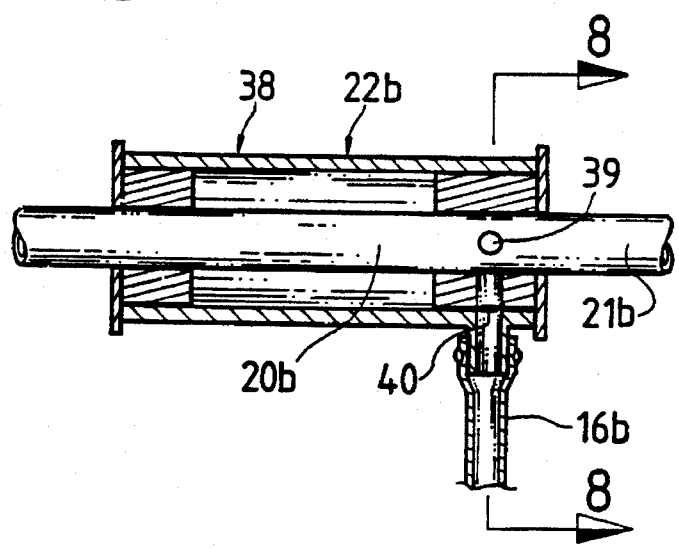
FIG. 7 is a sectional side elevation of the bearing assembly for the tilt means of the apparatus in FIG. 6.
Figure 8:
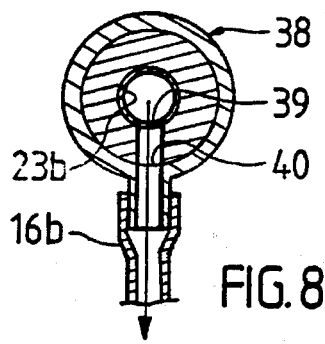
FIG. 8 is a cross-sectional view taken on the line 8—8 in FIG. 7 but showing the delivery tube support member further rotated.

In the embodiment of FIGS. 6 to 8, instead of the trough member 10b tilting down to lie near to vertically against the mounting post, it is arranged to tilt to an attitude again near to vertical but substantially coplanar with the post, being tiltable about a horizontal axis extending from the post means 19b (shown in dotted outline) through the centre line of the conical trough member 10b. The tubular support arm 20b is similar to the arm 20b of FIG. 4 except that it is conveniently of circular cross-section so that its proximal portion 23b can be passed rotatably through a bearing assembly 38 mounted rigidly on the post means 19b. The proximal portion 23b is in fact continued to provide an identical support 20b' for another trough member shown at 10b' movable in unison with the trough member 10b on the same mounting and both delivering through registering holes 39 and 40 when the operative disposition is attained, the delivery hose 16b being illustrated.

Also shown in FIG. 6 is a typical remote control means 41 whereby the tube 20b may be rotated in one direction or the other about its longitudinal axis by pulling in either of the respective directions indicated by the arrows 42 and 43 on the cable means 44 via a pair of pulleys 45 and four yoke arms 46 secured to the tube 20b about which the cable means passes, the cable being secured to one yoke arm only so that the arms operate in the manner of pulleys about the horizontal axis.

Figure 9:
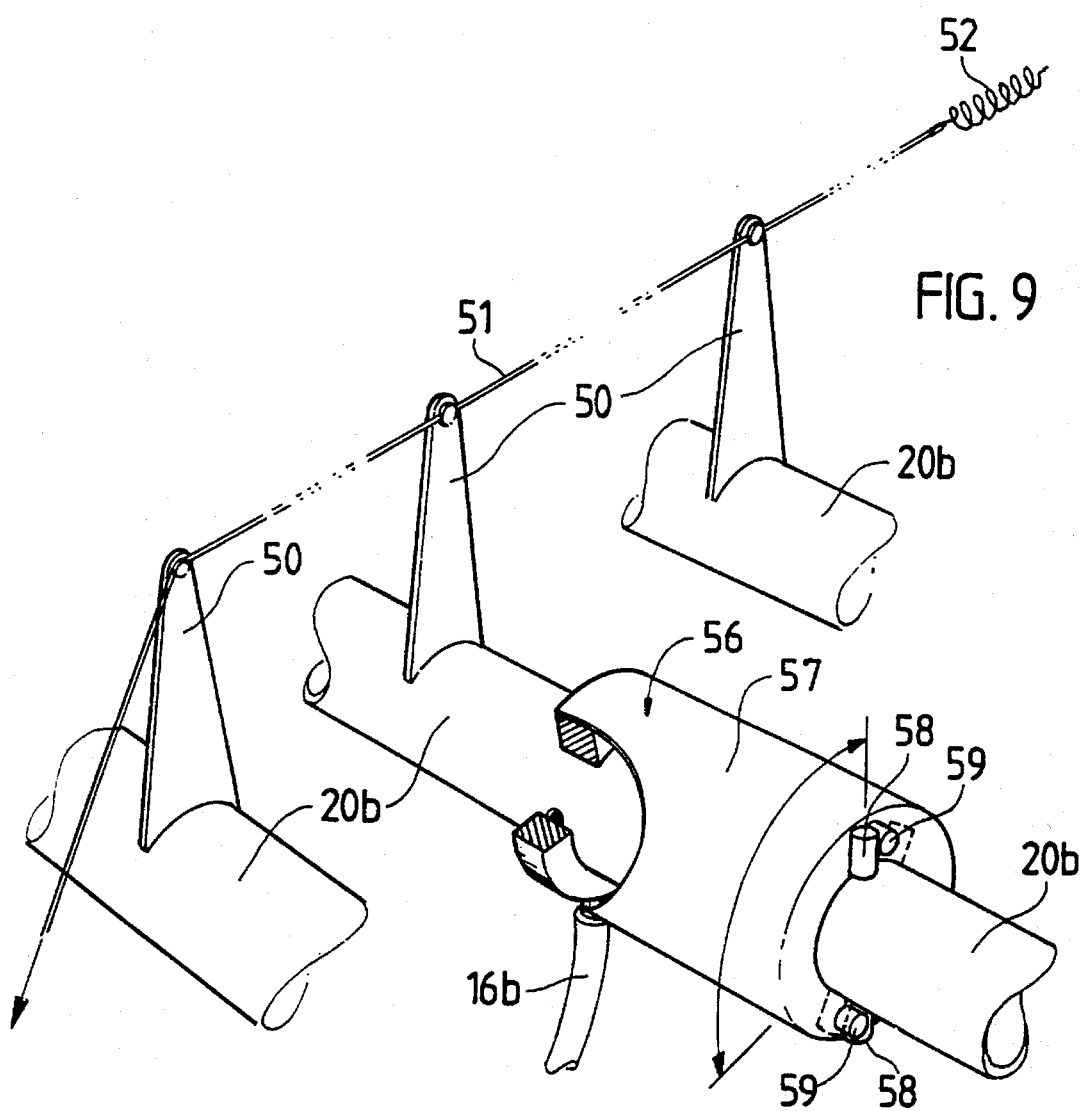
FIG. 9 shows in perspective view a bank of parallel pivotable trough support and water delivery members, part of the mechanism for actuating same in unison being also shown.
Figure 9A:
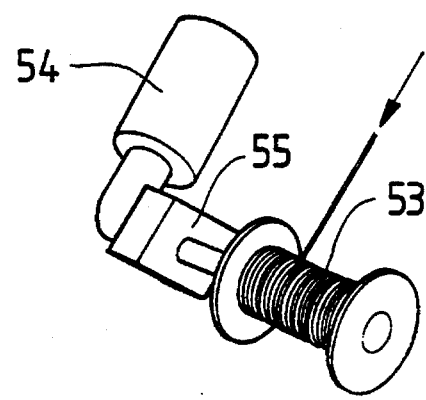
FIG. 9a shows in perspective view, in separated relationship to FIG. 9, the motor, gear box and pulley arrangement for the actuating cable of FIG. 9.

FIGS. 9 and 9a show design variations in the embodiment of FIG. 6 to enable a plurality of mounting tubes 20b to be mounted horizontally in parallelism, each having a crank arm 50 and connected to a common continuous cable 51, one end of which is connected to a tension spring 52 while the other end is wound on a pulley 53 adapted to be rotated by an electric motor 54 through a gearbox 55. Also shown is a typical bearing assembly 56 through which the mounting tube 20b passes rotatably with apertures to deliver water via hose 16b, the casing 57 of the bearing assembly 56 having stop pins 58 to be engaged by stop lugs 59 on the tube 20b to limit rotation against the action of the spring 52, the latter reversing rotation when the motor is rendered inoperative.

In the final embodiment shown in FIGS. 10, 11a, 11b and 11c, trough members 10c are of elongated rectangular form and identical construction, being arranged against one another in parallelism to receive water in the trough between dished surfaces lie and end plates 60, the latter having lowermost pivot fittings 61 which also constitute discharge outlets to carry water to delivery tube means 15c in the form of tubular mounting bars 64 having delivery hoses 16c. Rotation of the trough members 10c in unison is achieved by a cable 62 shown in the diagrammatic illustration of FIG. 11b to engage over pulleys 63 to invert the members 10c to the dispositions shown in FIG. 11c. This embodiment of the invention will be useful for areas normally requiring only a shade structure, but in this case convertible to a rain collecting structure when so desired by inverting the inoperative overhead slat-type members.

It will of course be understood that the embodiments herein are illustrative only and may be subject to many further variations of constructional detail and design, as well as using any form of power means for actuation of a plurality of collectors in unison, such as solar power, and the use of electronic controls for actuation in response to rain sensing. Most importantly, high grade NYLON or other materials may be used in the trough members so as to have no chemical reaction with the water, and high quality hose fittings can be selected to suit. The invention is to be understood to embrace all variations within its broad scope and ambit as defined by the appended claims.

I claim:

1. Apparatus for use in collecting potable rainwater including:

a trough member having a dished surface and adapted to receive rainwater when operatively disposed;

a discharge outlet in said trough member in that part thereof which is lowermost or near lowermost when the trough member is operatively disposed;

delivery tube means connected to said discharge outlet for conveying received rainwater for passage to storage or distribution means;

mounting frame means whereby said trough member may be mounted in a rain-receiving location, and tilt means operatively connecting said trough member to said mounting frame means;

the parts being so made and arranged that said tilt means will enable said trough member to be moved between said operative disposition in which rainwater is received and then delivered via said discharge outlet and said delivery tube means and an inoperative disposition in which it has been tilted from said operative disposition to one of such inverted, semi-inverted or inclined nature that said dished trough surface will not support liquid or solid materials; and said tilt means includes an elongate bracket having its outer or distal end connected to that part of the trough member which is the underneath part when operatively disposed, the other or proximal end of the bracket being pivotally connected about a horizontal tilt axis to a mounting post or other mounting surface constituting said mounting frame means.

2. Rainwater collecting apparatus according to claim 1, wherein said trough member is of substantially conical shape so that in operation it is of dished conical form and has its discharge outlet at the lowermost apex portion thereof.

3. Rainwater collecting apparatus according to claim 1 wherein said delivery tube means comprises a flexible hose leading directly from said discharge outlet to storage or distribution means.

4. Rainwater collecting apparatus according to claim 1, whereby releasable locking means is provided for securing said proximal end of said bracket to said mounting frame means in at least the operative disposition of said trough member.

5. Rainwater collecting apparatus according to claim 1, wherein said elongate bracket is tubular to constitute a first part of said delivery tube means, its distal end being connected to said discharge outlet while its proximal end is connected sealably with a flexible tube constituting a second, downstream part of said delivery tube means.

6. Rainwater collecting apparatus according to claim 5, wherein the proximal end of said elongate bracket is sealably pivotable about a bearing tube on the mounting frame means, said bearing tube having openings to receive water from the proximal end of the bracket and having a remote outlet end connected sealably with said tube constituting said second, downstream part of said delivery tube means.

7. Apparatus for use in collecting potable rainwater including:

a trough member having a dished surface and adapted to receive rainwater when operatively disposed;

a discharge outlet in said trough member in that part thereof which is lowermost or near lowermost when the trough member is operatively disposed:

delivery tube means connected to said discharge outlet for conveying received rainwater for passage to storage or distribution means;

mounting frame means whereby said trough member may be mounted in a rain-receiving location, and tilt means operatively connecting said trough member to said mounting frame means;

the parts being so made and arranged that said tilt means will enable said trough member to be moved between said operative disposition in which rainwater is received and then delivered via said discharge outlet and said delivery tube means and an inoperative disposition in which it has been tilted from said operative disposition to one of such inverted, semi-inverted or inclined nature that said dished trough surface will not support liquid or solid materials, and;

the tilt means including an elongate support member having its outer or distal end connected to that part of the trough member which is the underneath part when operatively disposed, the other or proximal end of the support member being journalled in a horizontal bearing on said mounting frames means, rotation of said support member in said bearing acting to pivot the trough member towards inverted inoperative disposition.

8. Rainwater collecting apparatus according to claim 7, wherein said elongate support member is tubular to constitute a first part of said delivery tube means, its distal end being connected to said discharge outlet while its proximal end is connected sealably with a tube constituting a second, downstream part of said delivery tube means.

9. Rainwater collecting apparatus according to claim 7, wherein the elongate support member is one of a plurality of parallel horizontal support members, and said trough member is one of a plurality of trough members corresponding to the support members, said tilt means including crank means whereby all support members may be rotated in unison to move the trough members from operative to inoperative dispositions and vice versa.

10. Apparatus for use in collecting potable rainwater including:

a trough member having a dished surface and adapted to receive rainwater when operatively disposed;

a discharge outlet in said trough member in that part thereof which is lowermost or near lowermost when the trough member is operatively disposed;

delivery tube means connected to said discharge outlet for conveying received rainwater for passage to storage or distribution means;

mounting frame means whereby said trough member may be mounted in a rain-receiving location, and tilt means operatively connecting said trough member to said mounting frame means;

the parts being so made and arranged that said tilt means will enable said trough member to be moved between said operative disposition in which rainwater is received and then delivered via said discharge outlet and said delivery tube means and an inoperative disposition in which it has been tilted from said operative disposition to one of such inverted, semi-inverted or inclined nature that said dished trough surface will not support liquid or solid materials, characterized in that said trough member is of substantially elongate rectangular dish-like form having opposed water-retaining rims or surfaces and said tilt means comprises mounting means about which the trough member may be pivoted between operative disposition and substantially inverted inoperative disposition about a horizontal pivot axis extending longitudinally through said trough member between said opposed water retaining rims or surfaces.

11. Apparatus for use in collecting potable rainwater including:

a plurality of trough members of elongate rectangular dish-like form having opposed water-retaining rims or surfaces, the trough members being arranged parallel to and adjacent one another;

a discharge outlet in said trough member in that part thereof which is lowermost or near lowermost when the trough member is operatively disposed;

delivery tube means connected to said discharge outlet for conveying received rainwater for passage to storage or distribution means;

mounting frame means hereby said trough member may be mounted in a rain-receiving location, and a plurality of tilt means operatively connecting said trough members to said mounting frame means respectively, each said tilt means comprising mounting means about which the corresponding trough member may be pivoted between operative disposition and substantially inverted inoperative disposition about a horizontal pivot axis extending longitudinally through said trough member between said opposed water retaining rims or surfaces, the parts being so made and arranged that said tilt means will enable said trough member to be moved betweens said operative disposition in which rainwater is received and then delivered via said discharge outlet and said delivery tube means and an inoperative disposition in which it has been tilted from said operative disposition to one of such inverted, semi-inverted or inclined nature that said dished trough surface will not support liquid or solid materials, the apparatus further including means whereby said through members may be pivoted in unison from operative to inoperative dispositions and vice versa.

12. Rainwater collecting apparatus according to claim 11, wherein adjacent trough members are substantially identical and include edge portions extending outwardly from said opposed water retaining rims or surfaces, one of said edge portions of each trough member being adapted to abut the opposite edge portion of the adjacent trough member when in the operative disposition.

* * * * *